United States Patent
Malecha et al.

(10) Patent No.: US 11,319,075 B1
(45) Date of Patent: May 3, 2022

(54) COMPRESSIBLE CUSHION FOR AN AIRCRAFT SEAT

(71) Applicant: B/E Aerospace, Inc., Winston-Salem, NC (US)

(72) Inventors: Jeremy F. Malecha, Pfafftown, NC (US); Charles Zurian, Kernersville, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/198,120

(22) Filed: Mar. 10, 2021

(51) Int. Cl.
*B64D 11/06* (2006.01)

(52) U.S. Cl.
CPC ................. *B64D 11/0647* (2014.12)

(58) Field of Classification Search
CPC ............ B64D 11/0647; B64D 11/06
USPC ..................... 297/452.55, 452.48
See application file for complete search history.

(56) References Cited

U.S. PATENT DOCUMENTS

| | | | | |
|---|---|---|---|---|
| 3,369,262 A * | 2/1968 | Judd | ............ | B64D 11/06 441/127 |
| 4,294,240 A * | 10/1981 | Thill | ............ | A61F 13/041 602/21 |
| 4,433,302 A * | 2/1984 | Davies | ............ | H03F 3/3066 330/256 |
| 4,773,703 A * | 9/1988 | Krugener | ............ | B60N 2/0284 297/284.1 |
| 5,081,728 A * | 1/1992 | Skinner | ............ | A47C 27/001 5/411 |
| 5,370,444 A * | 12/1994 | Stulik | ............ | A47C 1/023 297/284.11 |
| 5,520,438 A | 5/1996 | Stulik | | |
| 6,167,790 B1 * | 1/2001 | Bambara | ............ | B32B 7/02 83/13 |
| 8,991,921 B2 * | 3/2015 | Peterson | ............ | A47C 1/023 297/284.11 |
| 10,045,631 B2 | 8/2018 | Tiffany | | |
| 2010/0330330 A1 * | 12/2010 | Luca | ............ | B29C 44/5654 428/137 |

FOREIGN PATENT DOCUMENTS

| | | |
|---|---|---|
| DE | 102006037080 | 3/2011 |
| DE | 102009060628 A1 | 4/2014 |
| EP | 2345344 B1 | 11/2012 |

OTHER PUBLICATIONS

Lantal, "The Pneumatic Comfort System (PCS)", https://www.lantal.com/america/en-us/aircraft/products/seat/pneumatic-comfort-system/, Downloaded Mar. 11, 2020.

\* cited by examiner

*Primary Examiner* — Mark R Wendell
(74) *Attorney, Agent, or Firm* — Suiter Swantz pc llo

(57) ABSTRACT

A compressible cushion may include a base structure and a plurality of foam layers positioned on a seat pan of the aircraft seat. The plurality of foam layers may include a first foam layer stacked on the base structure, and at least a second foam layer stacked on the first foam layer. A density of the at least a second foam layer may be less than a density of the first foam layer. The first foam layer and the at least a second foam layer may be cut at a length corresponding to a length of the seat pan when in an extended position. The first foam layer and the at least a second foam layer each may include a plurality of cuts, which may be configured to compress when the seat pan actuates between the extended position and a retracted position.

14 Claims, 17 Drawing Sheets

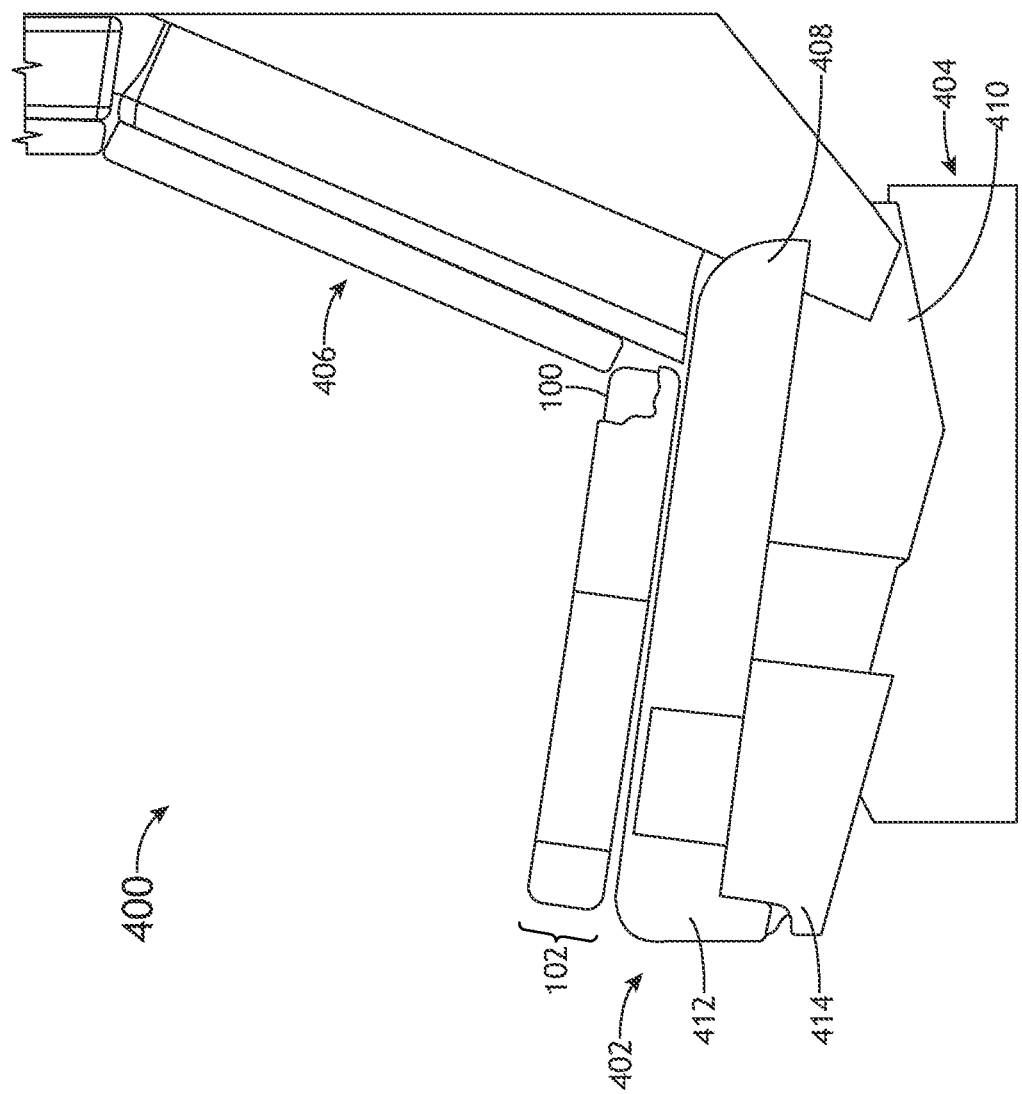

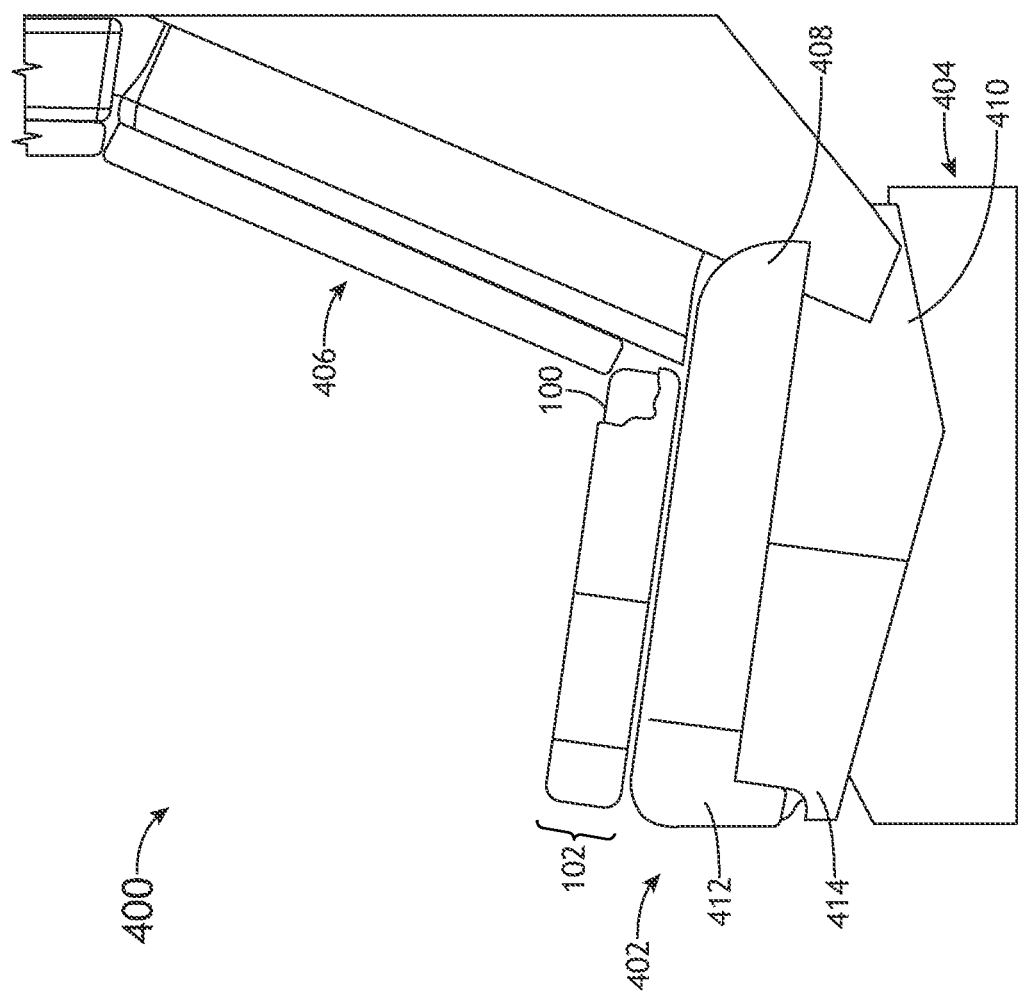

COMPRESSIBLE CUSHION FOR AN AIRCRAFT SEAT

BACKGROUND

Aircraft seats may include components such as a seat pan, a cushion, and a dress cover. Where the seat pan is extendable to increase pan length for a passenger, the cushion may need to similarly extend. As a result, the cushion may include a primary cushion and auxiliary cushions, between which a void or gap may develop following the extension of the seat pan. The void or gap may be filled in with an airbag or air bladder system which is positioned between the primary cushion and auxiliary cushions, inflates as the seat pan extends outward, and deflates as the seat pan extends inward. This increases the number of parts and the complexity of the aircraft seat, as well as the surrounding aircraft cabin which provides the hookups for the aircraft seat and its components. In addition, the airbag or air bladder system may be uncomfortable and/or provide a less-than-attractive aircraft seat appearance.

Meeting aviation guidelines and/or standards such as flame requirements tests for aircraft cabin interior structures or components such as aircraft seats may require the addition of a fire blocker layer between the cushion and the dress cover. The flame blocker layer may cause the cushion to be stiff, reducing an ability of the cushion to be conformed to the seat pan and/or reducing an ability of the cushion to conform to an occupant when seated.

SUMMARY

A compressible cushion for an aircraft seat is disclosed, in accordance with one or more embodiments of the disclosure. The cushion may include a base structure. The cushion may include a plurality of foam layers positioned on a seat pan of the aircraft seat. The plurality of foam layers may include a first foam layer stacked on the base structure. The plurality of foam layers may include at least a second foam layer stacked on the first foam layer. A density of the at least a second foam layer may be less than a density of the first foam layer. The first foam layer and the at least a second foam layer may be cut at a length corresponding to a length of the seat pan when the seat pan is in an extended position. The first foam layer and the at least a second foam layer each may include a plurality of cuts. The plurality of cuts of the first foam layer and the plurality of cuts of the at least a second foam layer each may be configured to compress when the seat pan actuates between the extended position and a retracted position.

In some embodiments, the first foam layer and the at least a second foam layer each may be configured to pass flame requirements tests as set forth in 14 C.F.R. § 25.853 and corresponding Appendix F.

In some embodiments, the plurality of cuts in the first foam layer and the plurality of cuts in the at least a second foam layer each may have a width preventing the plurality of cuts in the first foam layer and the plurality of cuts in the at least a second foam layer from fully collapsing when the seat pan is in the retracted position.

In some embodiments, the plurality of cuts in the first foam layer may be aligned with the plurality of cuts in the at least a second foam layer.

In some embodiments, the first foam layer and the at least a second foam layer may be joined together with an adhesive.

In some embodiments, the plurality of cuts may be made in the first foam layer and the plurality of cuts may be made in the at least a second foam layer after the first foam layer and the at least a second foam layer are joined together with the adhesive.

In some embodiments, the plurality of cuts may be made in the first foam layer and the plurality of cuts may be made in the at least a second foam layer prior to the first foam layer and the at least a second foam layer being joined together with the adhesive.

In some embodiments, the at least a second foam layer may include a second foam layer stacked on the first foam layer. The at least a second foam layer may include a third foam layer stacked on the second foam layer.

In some embodiments, a density of the second foam layer may be less than the density of the first foam layer. A density of the third foam layer may be less than the density of the second foam layer.

In some embodiments, at least one of the base structure or the plurality of foam layers may be dimensioned to conform to the seat pan of the aircraft seat.

In some embodiments, at least one of the base structure or the plurality of foam layers may be dimensioned to conform to an occupant seated in the aircraft seat.

In some embodiments, at least a portion of the plurality of foam layers and at least a portion of the base structure may be covered by a dress cover.

In some embodiments, the plurality of foam layers may be enclosed within the dress cover. At least a portion of the base structure may be covered by the dress cover.

In some embodiments, the plurality of foam layers and the base structure may be enclosed within the dress cover.

An aircraft seat is disclosed, in accordance with one or more embodiments of the disclosure. The aircraft seat may include a seat pan configured to actuate between an extended position and a retracted position. The aircraft seat may include a compressible cushion positioned on the seat pan. The cushion may include a base structure. The cushion may include a plurality of foam layers positioned on a seat pan of the aircraft seat. The plurality of foam layers may include a first foam layer stacked on the base structure. The plurality of foam layers may include at least a second foam layer stacked on the first foam layer. A density of the at least a second foam layer may be less than a density of the first foam layer. The first foam layer and the at least a second foam layer may be cut at a length corresponding to a length of the seat pan when the seat pan is in the extended position. The first foam layer and the at least a second foam layer each may include a plurality of cuts. The plurality of cuts of the first foam layer and the plurality of cuts of the at least a second foam layer each may be configured to compress when the seat pan actuates between the extended position and the retracted position.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 4A illustrates a side-profile view of an aircraft seat including a compressible cushion, in accordance with one or more embodiments of the present disclosure;

FIG. 4B illustrates a side-profile view of an aircraft seat including a compressible cushion, in accordance with one or more embodiments of the present disclosure;

DETAILED DESCRIPTION OF THE INVENTION

Figure 1:
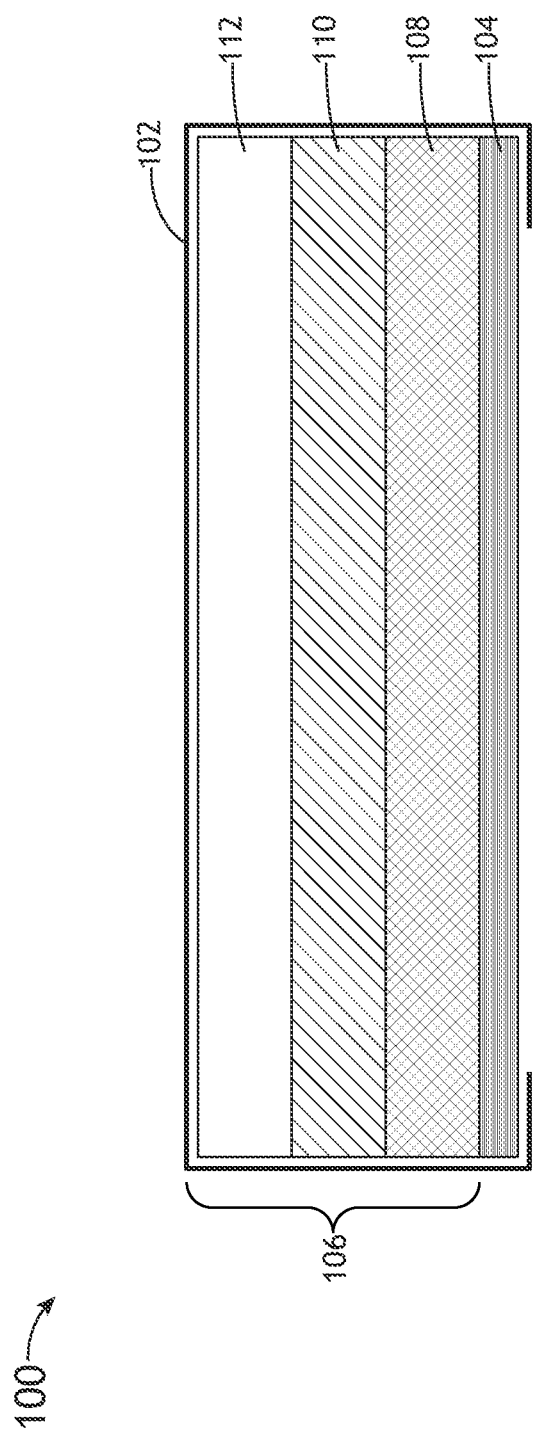
FIG. 1 illustrates a side profile view of a compressible cushion for an aircraft seat, in accordance with one or more embodiments of the present disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-5D generally illustrate a compressible cushion for an aircraft seat, in accordance with one or more embodiments of the disclosure.

Aircraft seats may include components such as a seat pan and a cushion. Where the seat pan is extendable to increase pan length for a passenger, the cushion may need to similarly extend. As a result, the cushion may include a primary cushion and auxiliary cushions, between which a void or gap may develop following the extension of the seat pan. The void or gap may be filled in with an airbag or air bladder system which is positioned between the primary cushion and auxiliary cushions, inflates as the seat pan extends outward, and deflates as the seat pan extends inward. This increases the number of parts and the complexity of the aircraft seat, as well as the surrounding aircraft cabin which provides the hookups for the aircraft seat and its components. In addition, the airbag or air bladder system may be uncomfortable and/or provide a less-than-attractive aircraft seat appearance.

Meeting aviation guidelines and/or standards such as flame requirements tests for aircraft cabin interior structures or components such as aircraft seats may require the addition of a fire blocker layer between the cushion and the dress cover. In select industries the build of the aircraft seat (and any included components within the build) may be required to meet guidelines and/or standards. The aircraft seat may be required to meet aviation guidelines and/or standards, by being configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. For example, the aircraft seat and/or its components may be required to meet and/or exceed flame tests as set forth by the aviation guidelines and/or standards. For instance, the cushion may be rated to pass flame requirement tests for aircraft cabin interior installations (e.g., structures or components) such as seat cushions by the aviation guidelines and/or standards under 14 C.F.R. Part 25 and its Appendixes (e.g., 14 C.F.R. § 25.853, also found in FAA Advisory Circular (AC) 25.853-1), or the like.

The flame blocker layer may cause the cushion to be stiff, reducing an ability of the cushion to be may be dimensioned to conformed to the seat pan and/or reducing an ability of the cushion to may be dimensioned to conform to an occupant when seated. In this regard, the flame blocker layer may be uncomfortable and/or provide a less-than-attractive aircraft seat appearance.

As such, it would be desirable to create a cushion that addresses the shortcomings provided above.

Embodiments of the present disclosure are directed to a compressible cushion for an aircraft seat. Embodiments of the present disclosure are also directed to an even compression of the cushion. Embodiments of the present disclosure are also directed to distributing occupant weight with the compressible cushion.

FIG. 1 illustrates a compressible cushion 100 surrounded at least in part by a dress cover 102, in accordance with one or more embodiments of the present disclosure. It is noted herein "compressible cushion 100" and variants including, but not limited to, "cushion 100" may be considered equivalent, for purposes of the present disclosure.

In one embodiment, the cushion 100 may include a base structure or support 104. For example, the base structure or support 104 may be fabricated from a solid piece of metal, plastic, or fabric. By way of another example, the base structure or support 104 may be fabricated from a patterned piece or pieces of metal, plastic, or fabric. By way of another example, the base structure or support 104 may be a metal, plastic, or fabric diaphragm.

In another embodiment, the cushion 100 may include one or more layers 106 fabricated from a foam. For example, the cushion 100 may include a first layer 108, a second layer 110, and a third layer 112. It is noted herein the one or more layers 106 and the base structure or support may be at least partially covered or enclosed (e.g., contained within) by the dress cover 102. For example, the dress cover 102 may wrap around one or more edges, side surfaces, and/or bottom surface of the one or more layers 106 of foam and/or the base structure or support 104 to secure the dress cover 102 to the cushion 100. For instance, the cushion 100 may be fully enclosed (e.g., contained within) by the dress cover 102, while at least a portion of the base structure or support 104 may be covered or enclosed by the dress cover 102. In addition, both the cushion 100 and the base structure or support 104 may be fully enclosed (e.g., contained within) by the dress cover 102. It is noted herein the wrap-around nature of the dress cover 102 may assist in keeping the dress cover 102 taut.

In another embodiment, where there are multiple layers 106 of foam, the multiple layers 106 may be coupled together. For example, the multiple layers 106 may be coupled with an adhesive, with fasteners, or the like.

In another embodiment, where there are multiple layers 106, the multiple layers 106 may be fabricated from foam having the same or different densities. For example, the foam may be stacked, with the first layer 108 being constructed from a highest-density foam on the bottom (e.g., adjacent or on top of the base structure or support 104) and the third layer 112 being constructed from a lowest-density foam on the top.

It is noted herein stacking the foam in terms of increasing density from the top-down provides a number of benefits. First, this stacking of densities allows an occupant to sink into the cushion 100, as the bulk of the support for the occupant is generated in the lower or lowest layers 106 of foam. Second, this stacking of densities is the most likely to prevent an occupant from bottoming out in the cushion 100 by dropping all the way to the base structure or support 104, as it may takes increasingly more effort to compress the lower or lowest layers 106 of foam, which absorbs more or most of the downforce energy provided by the occupant.

It is noted herein the layers 106 of foam may be laid out in a basic or simple arrangement as illustrated in FIG. 1, or in any more intricate or contoured pattern or arrangement. For example, the arrangement may be selected to provide support or comfort in high-pressure areas. By way of another example, the arrangement may be selected to include higher-density foam on the sides of the stack of layers 106 to maintain a consistent cushion profile.

In general, parameters including, but not limited to, the number of layers 106, the thickness of each layer 106, the density of each layer 106, and the like may depend on factors including, but not limited to, type of aircraft seat (e.g., aircraft seat 400, as described throughout the present disclosure), an expected load the aircraft seat may be required to take, a seat design, or other factors.

It is noted herein select types of foam may not be able to pass flame requirement tests for aircraft cabin interior installations (e.g., structures or components) such as seat cushions as set forth by the aviation guidelines and/or standards under 14 C.F.R. Part 25 and its Appendixes (e.g., 14 C.F.R. § 25.853, also found in FAA Advisory Circular (AC) 25.853-1), or the like due to the foam producing high levels of smoke or toxic gas. To offset this, a fire block layer may be inserted between the cushion 100 and the dress cover 102 for the select types of foam to be usable in the cushion 100. However, the fire blocker layer may be uncomfortable and/or provide a less-than-attractive aircraft seat appearance.

As such, the layers 106 of the cushion 100 should be fabricated from a foam that does not require the use of a fire blocker layer. The foam should be capable of passing flame requirements tests in aviation guidelines and/or standards under 14 C.F.R. Part 25 (e.g., 14 C.F.R. § 25.853 and its Appendixes, also found in FAA Advisory Circular (AC) 25.853-1), or the like.

For example, the foam should be capable of passing the 14 C.F.R. § 25.853 Part II(a)(3) Oil Burner Test, either by itself or in conjunction with an appropriate covering material (e.g., from which the dress cover 102 may be fabricated).

By way of another example, the foam should be capable of passing the 14 C.F.R. § 25.853, Appendix F, Part 1(b)(4) 12-Second Vertical Test, as the classification of the foam falls under 14 C.F.R. § 25.853, Appendix F, Part I(a)(1)(ii). It is noted herein the other components of the aircraft seat and/or an aircraft cabin including the aircraft seat may need to be capable of passing the 14 C.F.R. § 25.853, Appendix F, Part 1(b)(4) 60-Second Vertical Test, if the classification of the other components falls under 14 C.F.R. § 25.853, Appendix F, Part 1(a)(1)(i).

In this regard, the removal of a fire blocker layer from the assembly including the cushion 100 and the dress cover 102 may result in a more pliable seating surface. When combined with a natural resilience and/or compression that foam provides, the cushion 100 may be dimensioned to conform to a seat pan of the aircraft seat and/or may be dimensioned to conform to an occupant seated in the aircraft seat, allowing for the occupant to sink into the cushion 100 without bottoming out in the cushion 100.

FIGS. 2A-2E illustrate the cushion 100 and the dress cover 102, in accordance with one or more embodiments of the present disclosure. FIGS. 2F and 2G illustrate an extendable cushion for comparison against the cushion 100.

Referring now to FIGS. 2A-2D, in one embodiment the cushion 100 may include a plurality of cuts 200 separated by foam material 202. In general, the plurality of cuts 200 may be oval or ellipse-cut, diamond-cut, hexagonal-cut, octagonal-cut, or the like. For example, the plurality of cuts 200 may include a width at some point along the length of each of the plurality of cuts 200 (e.g., through a center point of each of the plurality of cuts 200) that prevents the cuts from fully collapsing (e.g., going fully flat, where an entire length of opposite sides of each of the plurality of cuts 200 are in contact with one another) when the cushion 100 is fully compressed.

In another embodiment, the plurality of cuts 200 may be arranged in a pattern. For example, the plurality of cuts 200 may be arranged in rows 204. By way of another example, the plurality of cuts 200 may be arranged in columns 206. By way of another example, the plurality of cuts 200 may be arranged in diagonal lines. By way of another example, the plurality of cuts 200 may be arranged in some combination of rows 204, columns 206, or diagonal lines. It is noted herein, however, the plurality of cuts 200 may be un-patterned.

Where the plurality of cuts is arranged in rows 204, a center of adjacent cuts 200 in adjacent rows 204 may be offset by a distance 208. It is noted herein, however, a center of adjacent cuts 200 in adjacent rows 204 may be aligned or overlap.

Where the plurality of cuts is arranged in columns 206, a center of adjacent cuts 200 in adjacent columns 206 may be offset by a distance 210. It is noted herein, however, a center of adjacent cuts 200 in adjacent columns 206 may be aligned or overlap.

In another embodiment, where there are multiple layers 106 of foam, the multiple layers 106 may be joined together (e.g., with an adhesive, fasteners, or the like) prior to the one or more cuts 200 being cut. For example, this order may be preferable where the one or more cuts 200 are vertically-aligned within the multiple layers 106.

In another embodiment, where there are multiple layers 106 of foam, the plurality of cuts 200 may be cut in each individual layer 106 prior to the multiple layers 106 being joined together (e.g., with an adhesive, fasteners, or the like) prior to the plurality of cuts being cut. For example, this order may be used when the plurality of cuts 200 are vertically-aligned within the multiple layers 106. By way of another example, this order may be used when the plurality of cuts 200 in a particular layer 106 are at least partially offset from the plurality of cuts 200 in an adjacent layer 106 in the stack. It is noted herein, however, that the multiple layers 106 may need to be configured to prevent foam material 202 from a first layer 106 from entering the at least partially offsetting cuts 200 of an adjacent layer 106 when the cushion 100 is compressed with a force applied from above (e.g., an occupant sitting on the cushion 100).

Figure 2A:
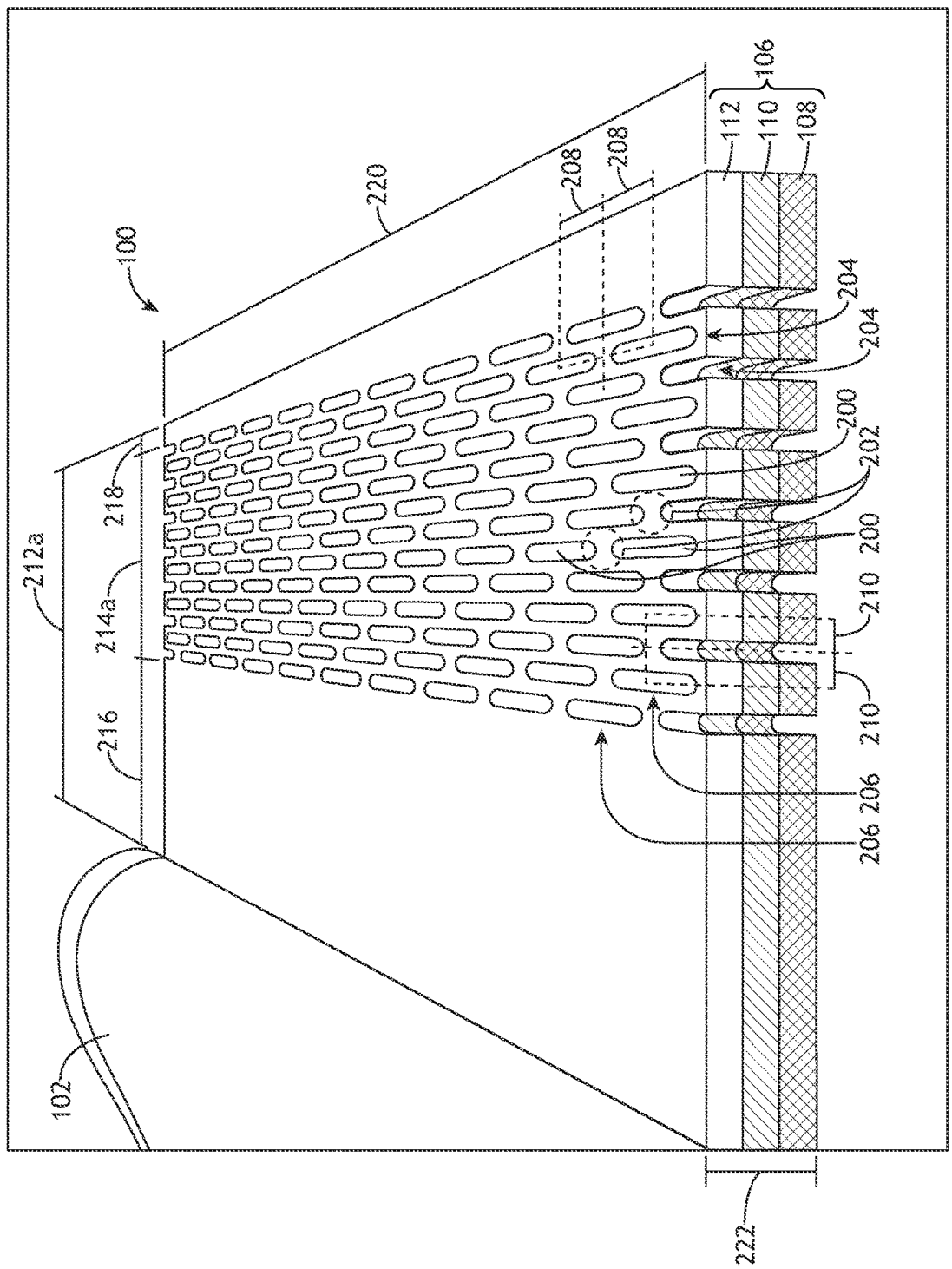
FIG. 2A illustrates a perspective view of a compressible cushion for an aircraft seat, in accordance with one or more embodiments of the present disclosure.
Figure 2B:
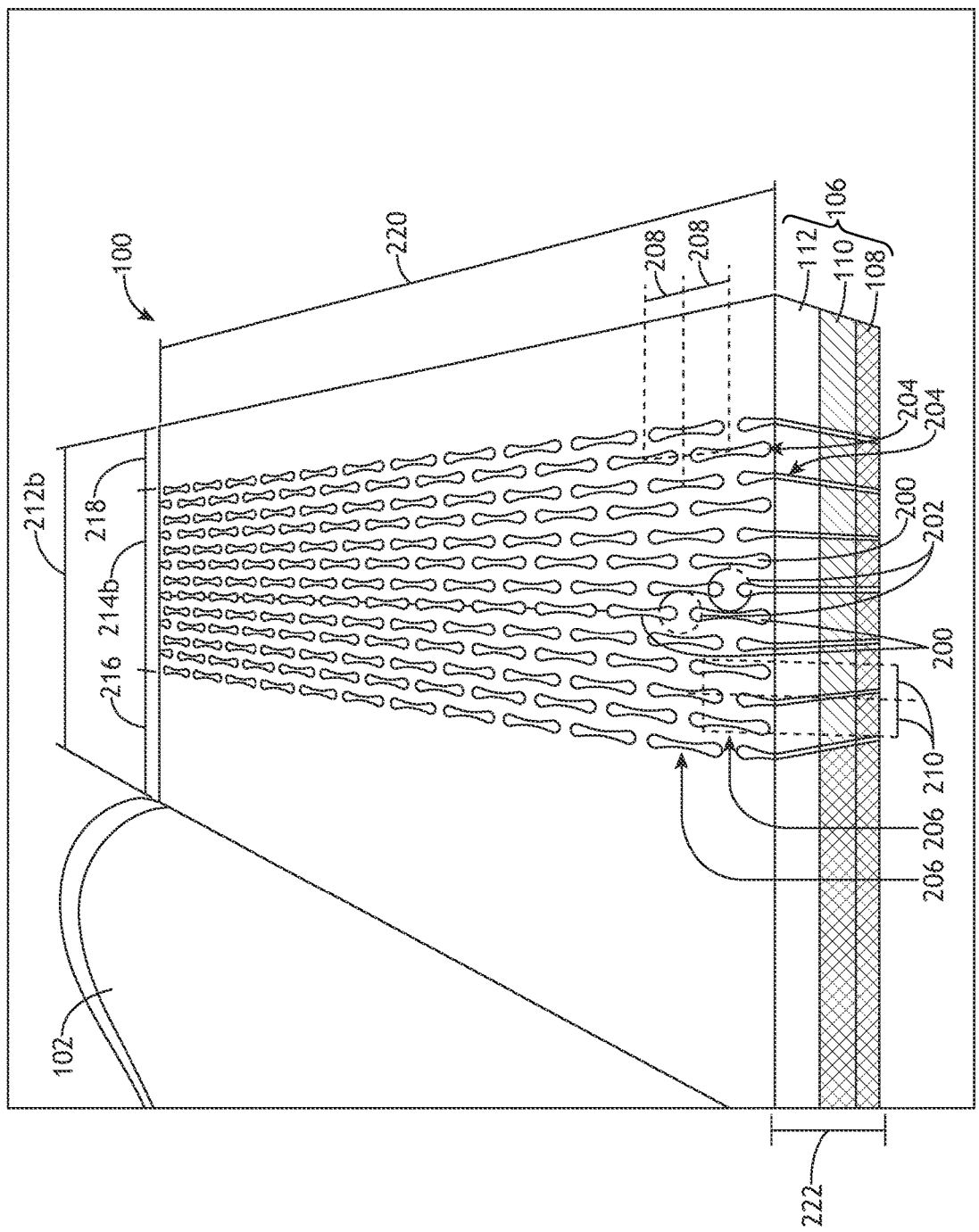
FIG. 2B illustrates a perspective view of a compressible cushion for an aircraft seat, in accordance with one or more embodiments of the present disclosure.
Figure 2C:
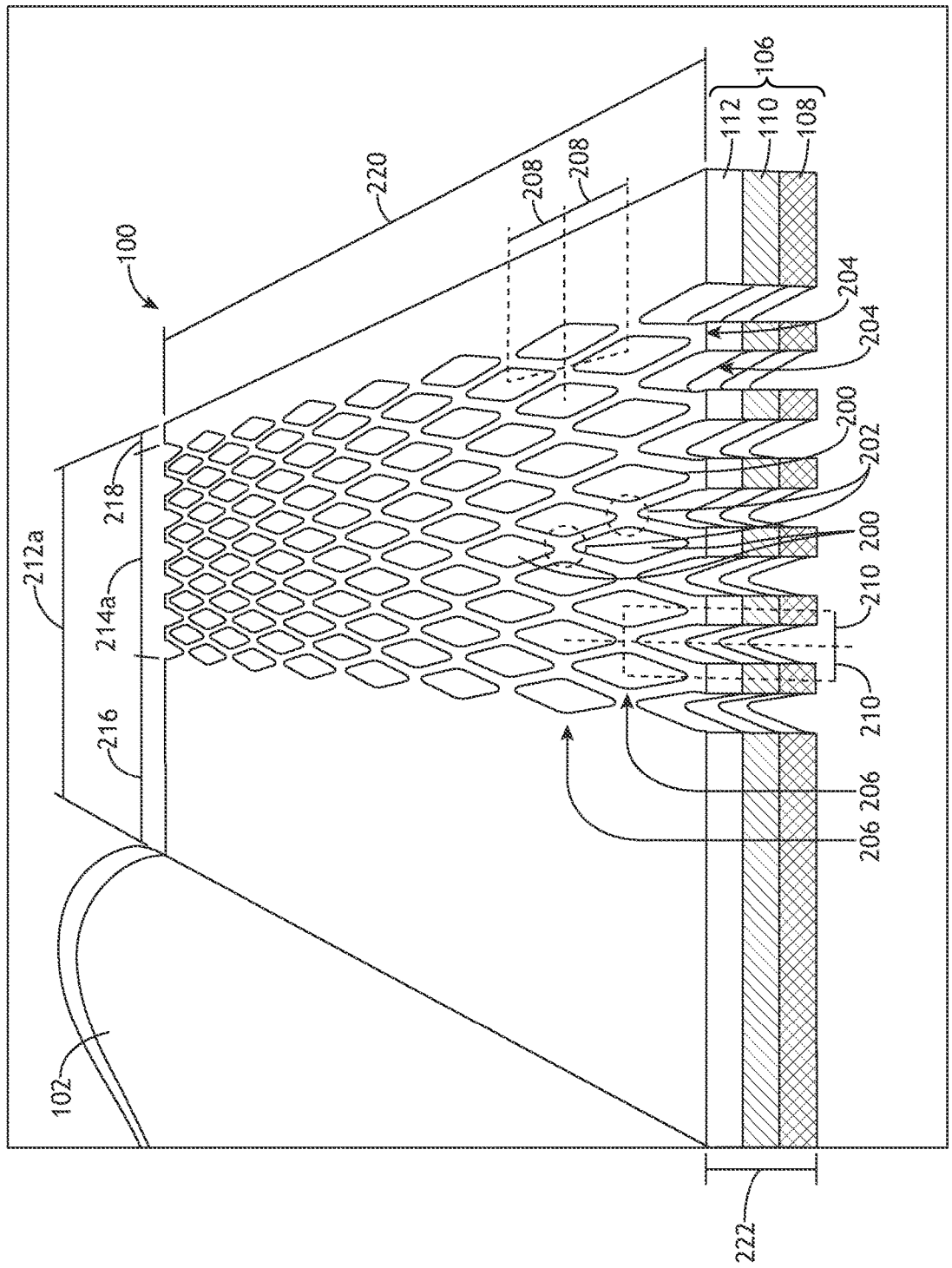
FIG. 2C illustrates a perspective view of a compressible cushion for an aircraft seat, in accordance with one or more embodiments of the present disclosure.

In another embodiment, as illustrated in FIGS. 2A and 2C, the cushion 100 is cut to a length 212. For example, the length 212 may be an expansion length 212a. For instance, the expansion length 212a may correspond to an extended position of a seat pan of an aircraft seat (e.g., seat pan 402 of the aircraft seat 400, as described throughout the present disclosure). It is noted herein the extension may be a full extension of the seat pan of the aircraft seat, such that the seat pan of the aircraft seat may not be capable of further extension.

The expansion length 212a may be broken into a cut length 214a corresponding to a section of the cushion 100 including the plurality of cuts 200, a rear length 216 between a rear edge of the cushion 100 and the section including the plurality of cuts 200, and a front length 218 between a front edge of the cushion 100 and the section including the plurality of cuts 200. For example, the rear length 216 may range between twelve and fifteen inches, allowing for a high-pressure area with full padding configured to support an occupant when seated. By way of another example, the front length 218 may range between three and four inches.

Figure 2D:
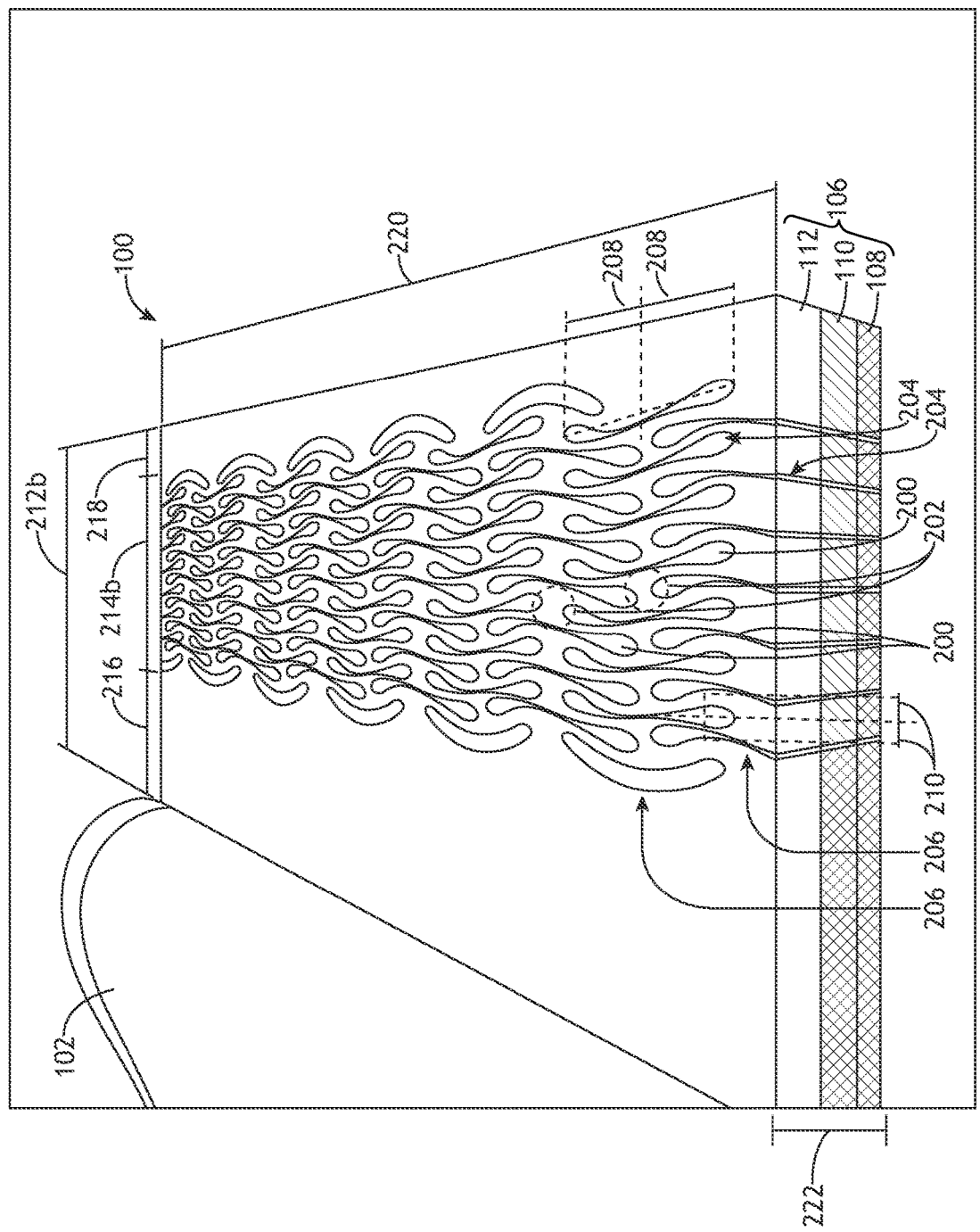
FIG. 2D illustrates a perspective view of a compressible cushion for an aircraft seat, in accordance with one or more embodiments of the present disclosure.

In another embodiment, as illustrated in FIGS. 2B and 2D, the cushion 100 is compressible with the actuation of the seat pan, such that the length 212 transitions to a compression length 212b. For example, the compression length 212b may correspond to a retraction of the seat pan of the aircraft seat (e.g., the seat pan 402 of the aircraft seat 400, as described throughout the present disclosure). It is noted herein the retraction may be a full retraction of the seat pan of the aircraft seat, such that the seat pan of an aircraft seat may not be capable of further retraction.

The expansion length 212b may be broken into a cut length 214b corresponding to a section of the cushion 100 including the plurality of cuts 200, the rear length 216 between the rear edge of the cushion 100 and the section including the plurality of cuts 200, and the front length 218 between the front edge of the cushion 100 and the section including the plurality of cuts 200. It is noted herein the foam material may be selected such that the compression of the cushion 100 is localized to the section including the plurality of cuts 200 leading to a change between the expansion length 212a and the compression length 212b. In this regard, the foam material in the sections having the lengths 216, 218 may not change during the transition between the extension of the seat pan of the aircraft seat (e.g., the seat pan 402 of the aircraft seat 400, as described throughout the present disclosure) and the retraction of the seat pan of the aircraft seat.

In another embodiment, the change in length 212 (and and/or cut length 214) between expansion and compression may be dependent on a type of aircraft seat (e.g., aircraft seat 400, as described throughout the present disclosure) on which the cushion 100 is installed. For example, the change in length 212 (and and/or cut length 214) between expansion and compression may range from 0.1 to ten inches. For instance, the change in length may be four inches. In addition, the change in length may be five inches.

In another embodiment, the cushion 100 is positionable in, and held in, any of a number of intermediate positions by the seat pan of the aircraft seat (e.g., the seat pan 402 of the aircraft seat 400, as described throughout the present disclosure).

Although embodiments of the present disclosure are directed to the sections of the cushion 100 with lengths 216, 218 not changing during the expansion or compression of the cushion 100, that the sections of the cushion 100 with lengths 216, 218 may expand or compress and subsequently change in length as well with the extension of the seat pan of the aircraft seat (e.g., the seat pan 402 of the aircraft seat 400, as described throughout the present disclosure) or retraction of the seat pan of the aircraft seat.

In another embodiment, the cushion 100 includes a width 220 and a thickness 222. For example, the width 220 may be dependent on a type of aircraft seat (e.g., aircraft seat 400, as described throughout the present disclosure) on which the cushion 100 is installed. By way of another example, the thickness 222 may be dependent on the type of aircraft seat on which the cushion 100 is installed. By way of another example, the thickness 222 may be set based on the number of layers 106 and/or the thickness of each layer 106.

Figure 2E:
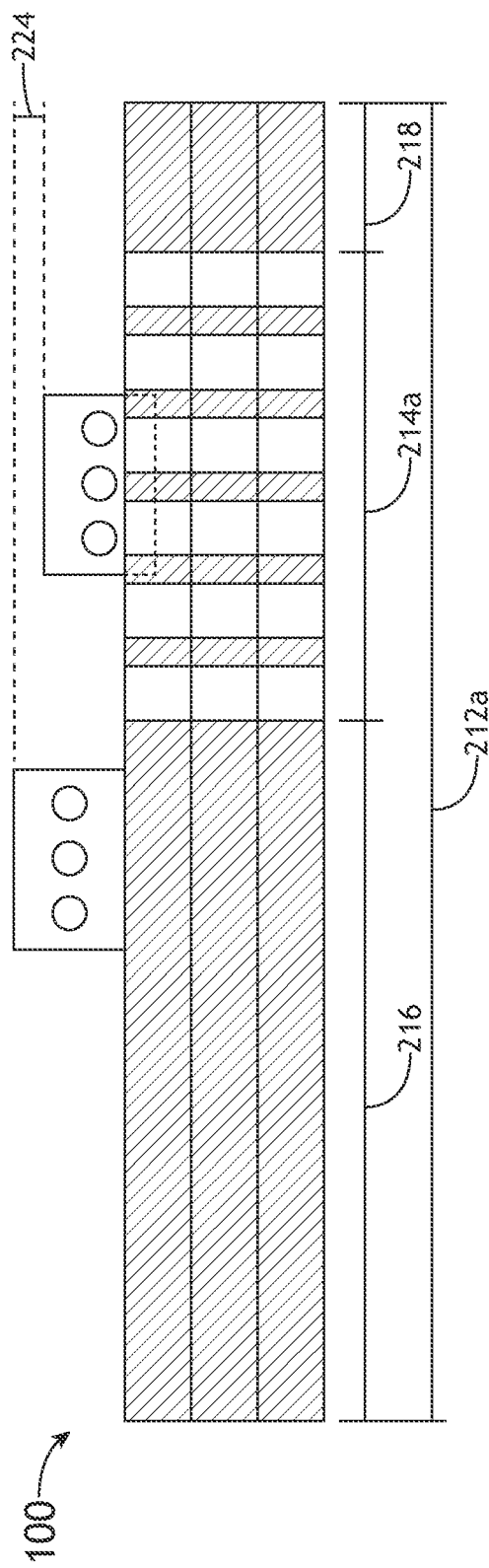
FIG. 2E illustrates a side profile view of a compressible cushion for an aircraft seat under a load, in accordance with one or more embodiments of the present disclosure.
Figure 2F:
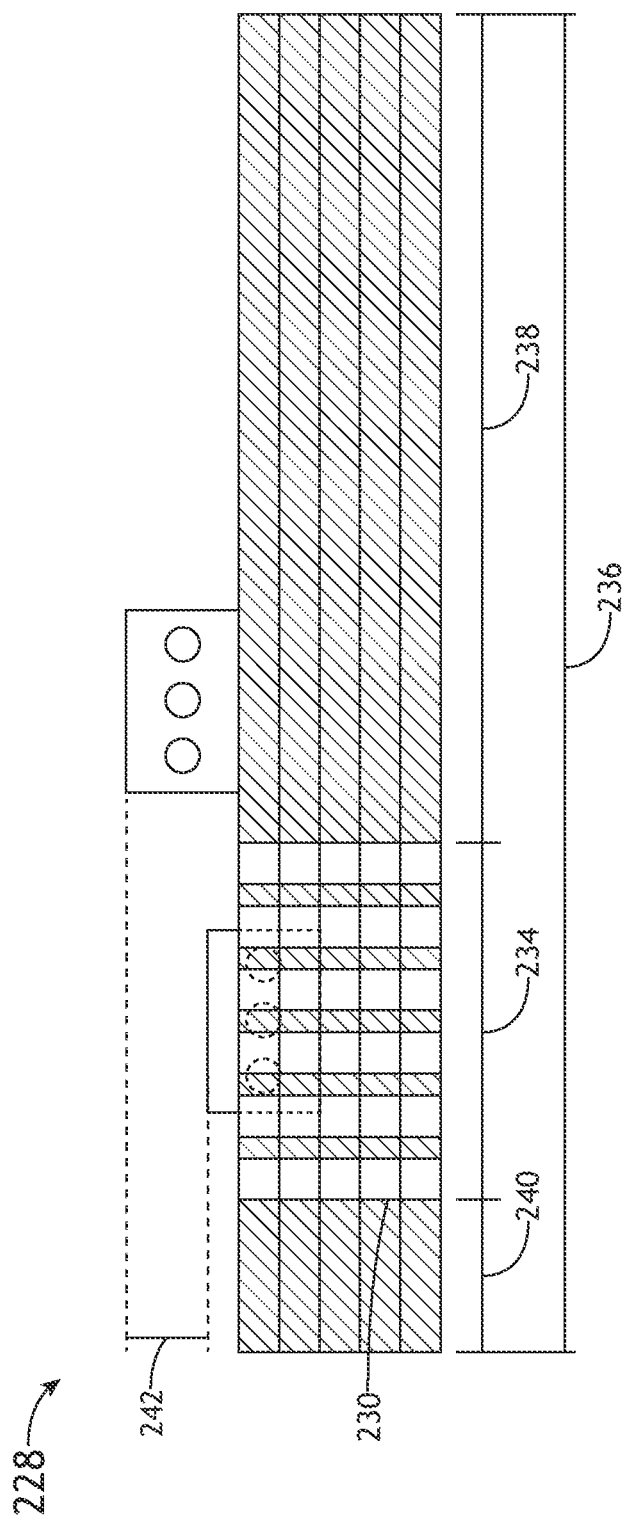
FIG. 2F illustrates a side profile view of an extendable cushion for an aircraft seat under a load.
Figure 2G:
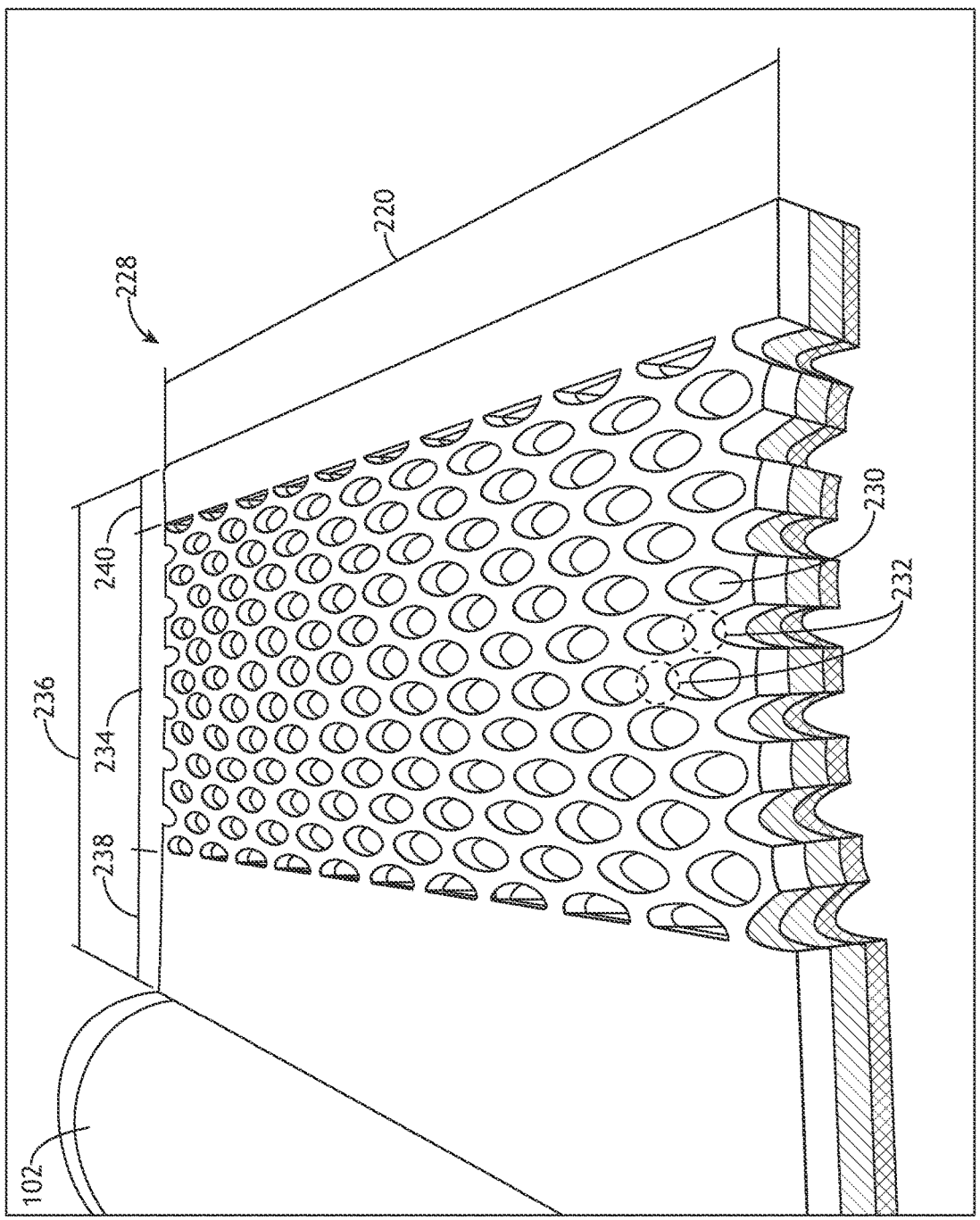
FIG. 2G illustrates a perspective view of an extendable cushion.

Referring now to FIG. 2E, the compressible cushion 100 is subjected to a load by a first weight being placed on a portion of the compressible cushion 100 within the rear length 216 without any cuts 200, and a second weight being placed on a portion of the compressible cushion 100 within the cut length 214 including the plurality of cuts 200. It is noted herein the placement of the weights were selected to represent forces applied by a passenger sitting on the cushion 100. In addition, a similar comparison may be performed with the first weight being placed in a portion of the compressible cushion 100 within the front length 218, and the second weight being placed in the portion of the compressible cushion 100 within the cut length 214 including the plurality of cuts 200. As illustrated in FIG. 2E, the weight will sink a select amount or distance 224 due to the plurality of cuts 200, where the plurality of cuts 200 and the cushion 100 is cut for the compressible cushion 100 to be at the extended length, such that the plurality of cuts 200 are compressible as illustrated in FIGS. 2A-2D.

Referring now to FIGS. 2F and 2G, an extendable cushion 228 is illustrated. The extendable cushion 228 includes a plurality of cuts 230 separated by foam material 232 within a cut length 234 of a full length 236, which were cut when the extendable cushion 228 is collapsed. When the extendable cushion 228 is expanded (e.g., as illustrated in FIG. 2G), the size of the plurality of cuts 230 increases and the foam material 232 is stretched. The extendable cushion 228 is subjected to a load by a first weight being placed on a portion of the extendable cushion within a rear length 238 of the full length 236 without any cuts 230, and a second weight being placed on a portion of the extendable cushion 228 within the cut length 234 including the plurality of cuts 230. It is noted herein the placement of the weights were selected to represent forces applied by a passenger sitting on the extendable cushion 228. In addition, a similar comparison may be performed with the first weight being placed in a portion of the extendable cushion 228 within a front length 240, and the second weight being placed in the portion of the extendable cushion 228 within the cut length 234 including the plurality of cuts 230. As illustrated in FIG. 2F, the weight will sink a select amount or distance 242 due to the plurality of cuts 230 being expanded when the extendable cushion 228 being extended.

As illustrated in a comparison between FIG. 2E and FIG. 2F, cutting the compressible cushion 100 with the plurality of cuts 200 at the expansion length 212a that corresponds to the extended position of a seat pan of an aircraft seat (e.g., seat pan 402 of the aircraft seat 400, as described throughout the present disclosure) may allow for the compressible cushion 100 to maintain an overall increased level of support for an occupant when the occupant is seated in the aircraft seat, as compared to if the extendable cushion 228 is cut with the plurality of cuts 230 at a compression length that corresponds to the retracted position of the seat pan of the aircraft seat. In particular, cutting the extendable cushion 228 with the plurality of cuts 230 at the compression length that corresponds to the retracted position of the seat pan of the aircraft seat, and then expanding the extendable cushion 228 (and thus expanding the plurality of cuts 230) with the extending of the seat pan would further increase a width of the plurality of cuts 230 and stretch out the foam material 232 between the plurality of cuts 230, narrowing at the middle and decreasing the amount of support the extendable cushion 228 may provide to the occupant when the occupant is seated in the aircraft seat in the extended position. In addition, cutting the extendable cushion 228 with the plurality of cuts 230 at the compression length that corresponds to the retracted position of the seat pan of the aircraft seat, and then expanding the extendable cushion 228 (and thus expanding the plurality of cuts 230) with the extending of the seat pan may include an uneven expansion with a force is applied (e.g., by an occupant seated in the aircraft seat). In this regard, the compressible cushion 100 of the present disclosure would provide a more constant or uniform amount of support at an overall increased level to the occupant when the occupant is seated in the aircraft seat whether the seat pan is in the extended position or the retracted position, as compared to the extendable cushion 228.

Figure 3A:
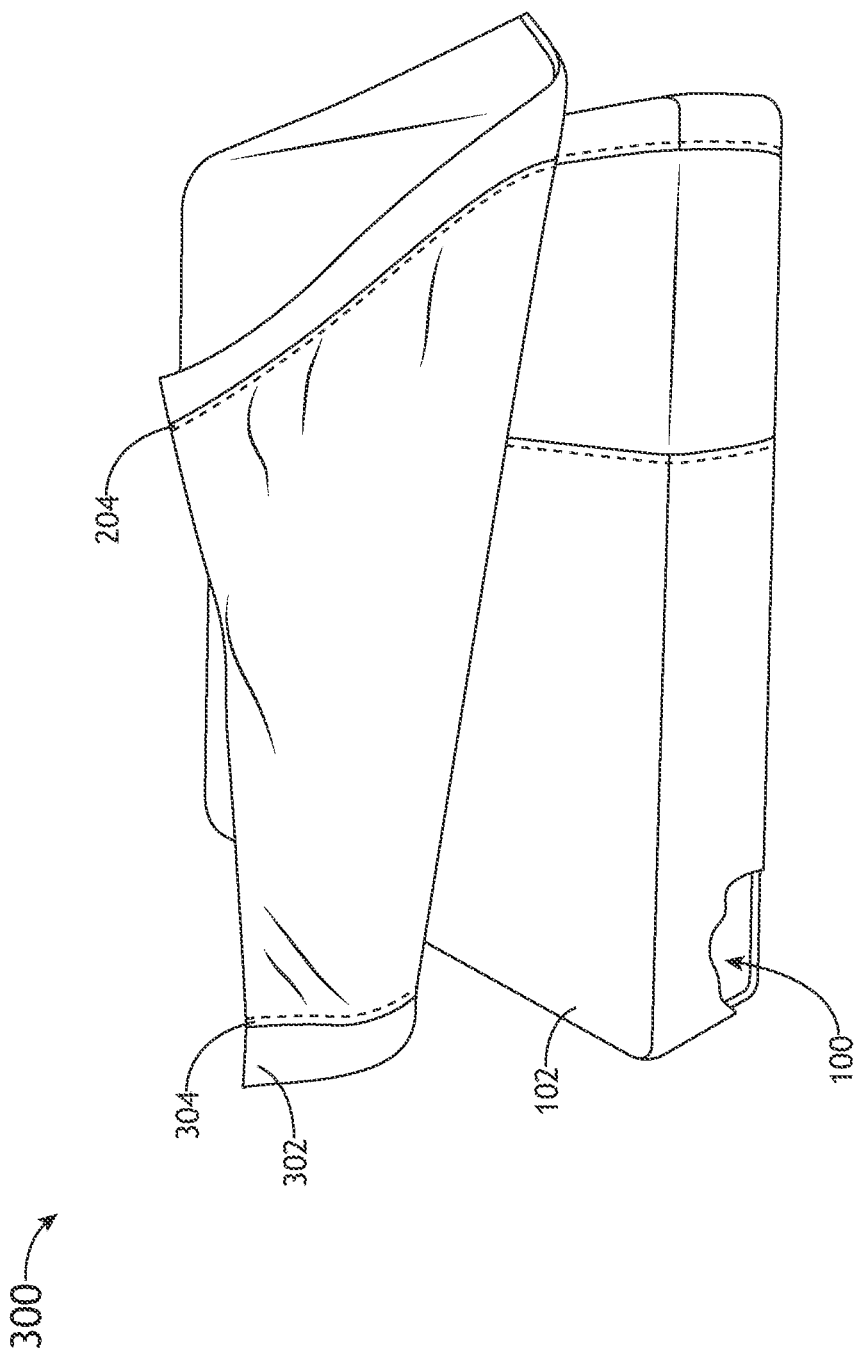
FIG. 3A illustrates a perspective view of a compressible cushion for an aircraft seat, in accordance with one or more embodiments of the present disclosure.
Figure 3B:
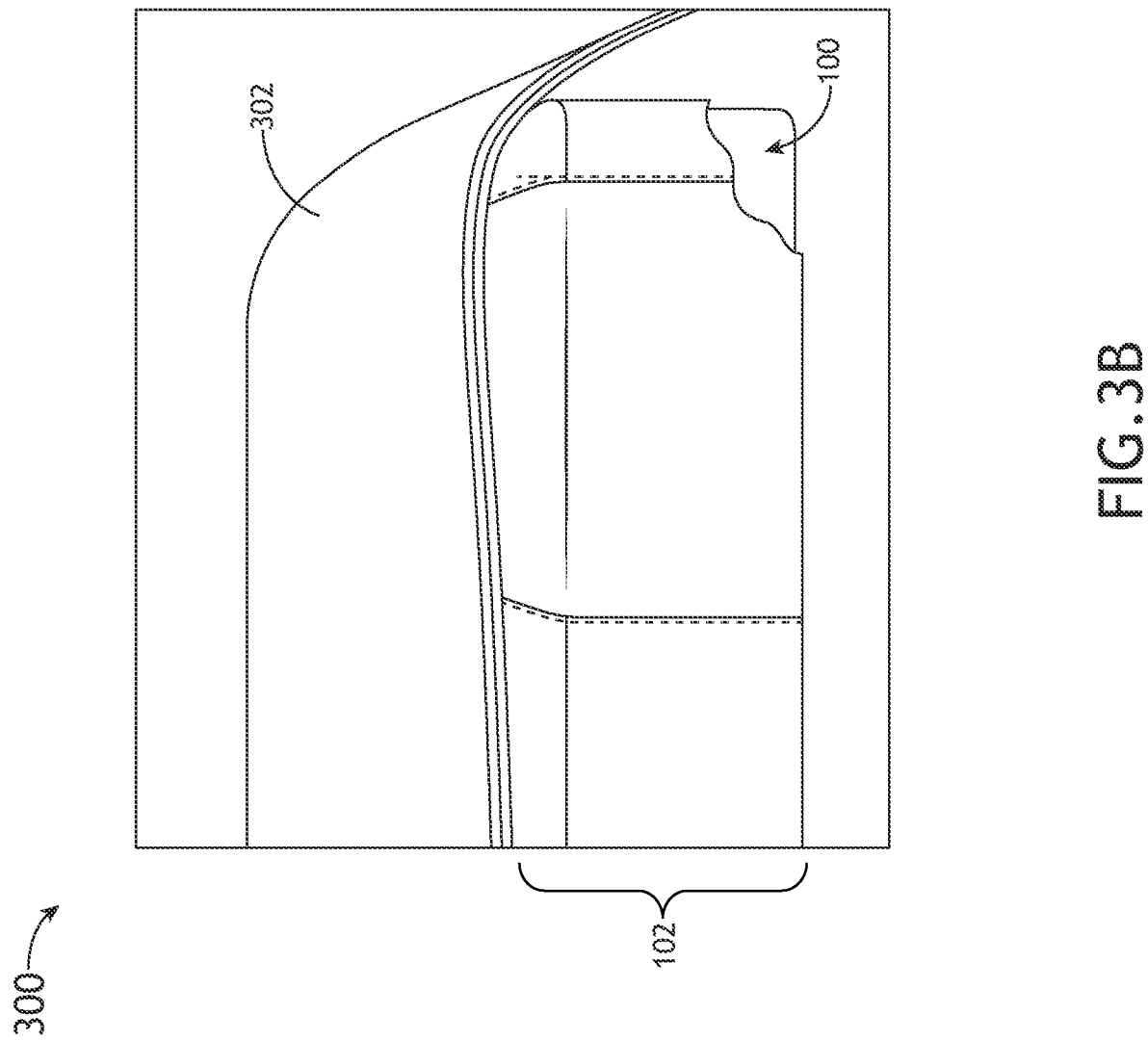
FIG. 3B illustrates a side-profile view of portions of a compressible cushion for an aircraft seat, in accordance with one or more embodiments of the present disclosure.
Figure 3C:
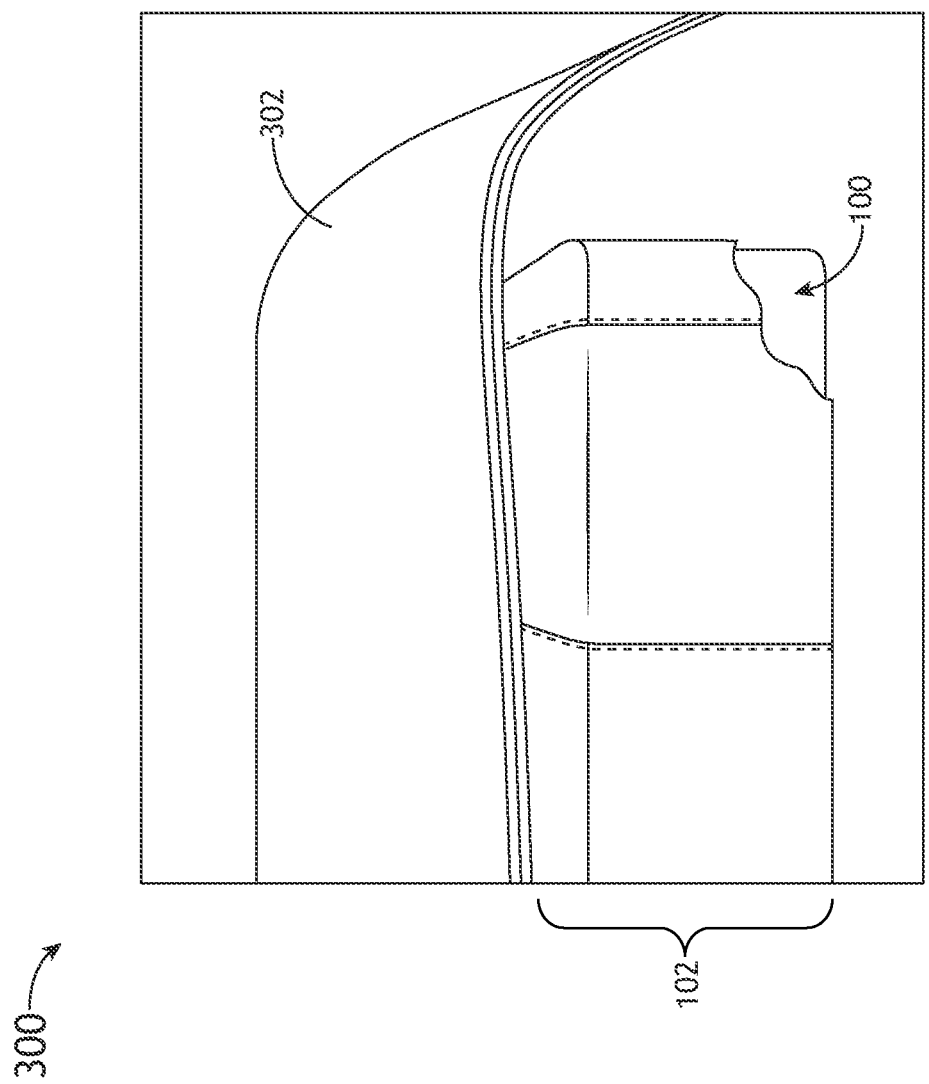
FIG. 3C illustrates a side-profile view of portions of a compressible cushion for an aircraft seat, in accordance with one or more embodiments of the present disclosure.
Figure 5A:
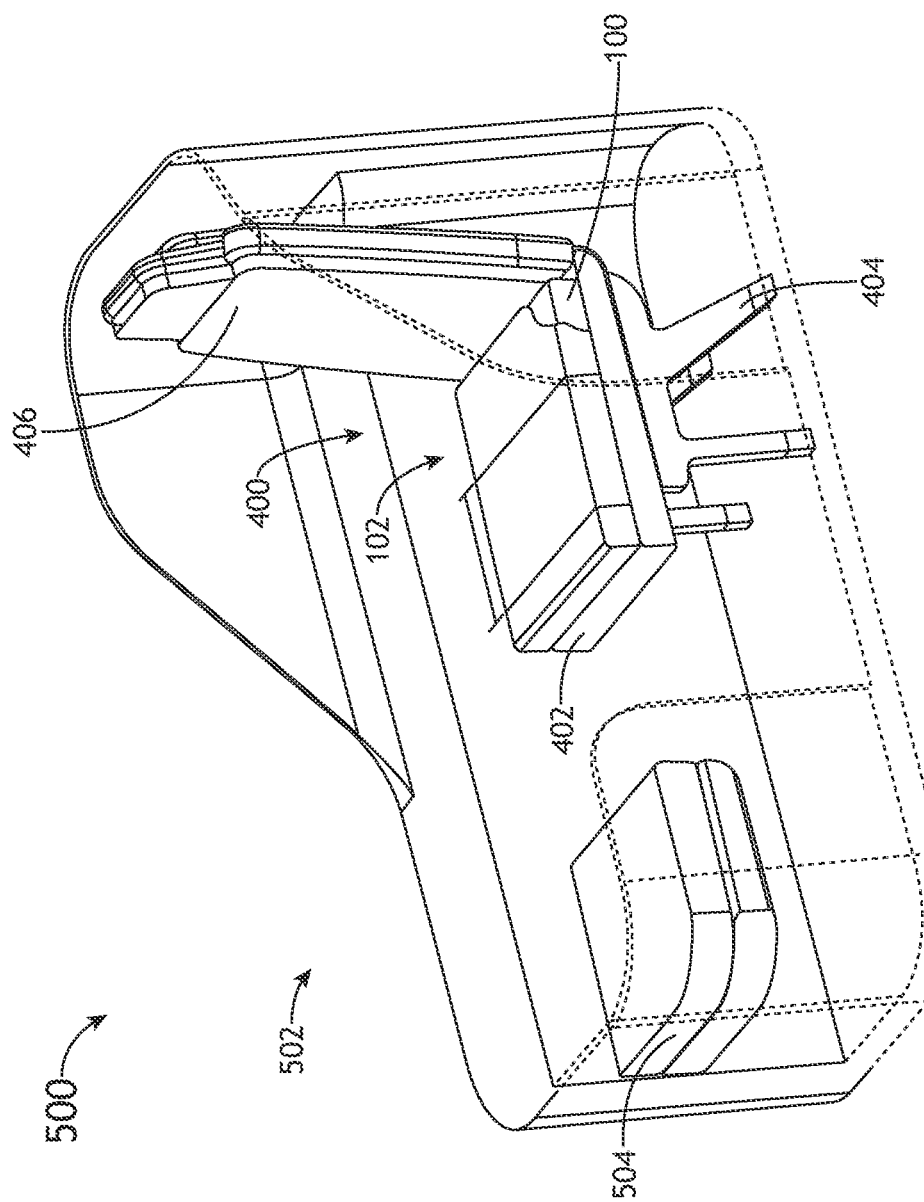
FIG. 5A illustrates a perspective view of a passenger compartment including an aircraft seat with a compressible cushion, in accordance with one or more embodiments of the present disclosure.
Figure 5B:
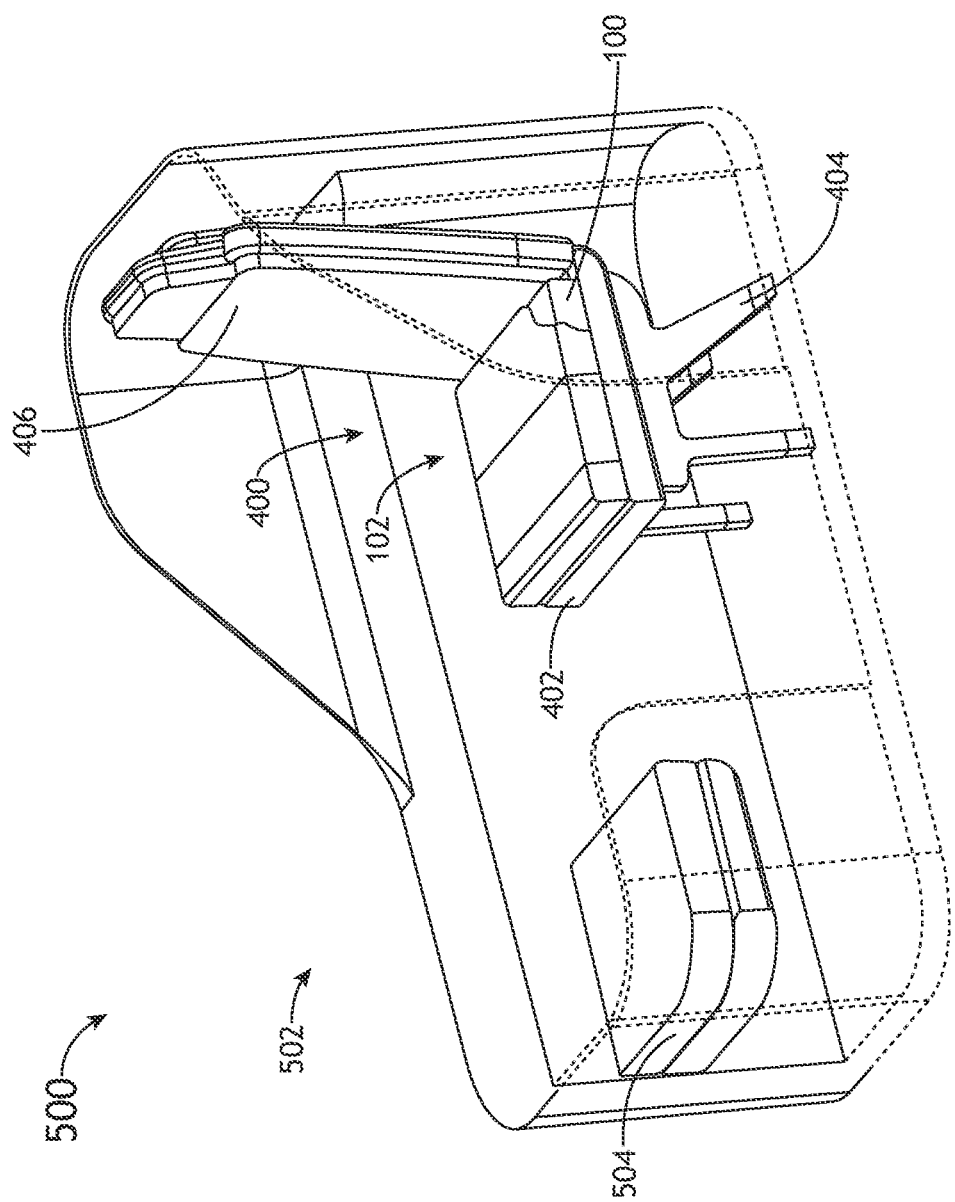
FIG. 5B illustrates a perspective view of a passenger compartment including an aircraft seat with a compressible cushion, in accordance with one or more embodiments of the present disclosure.
Figure 5C:
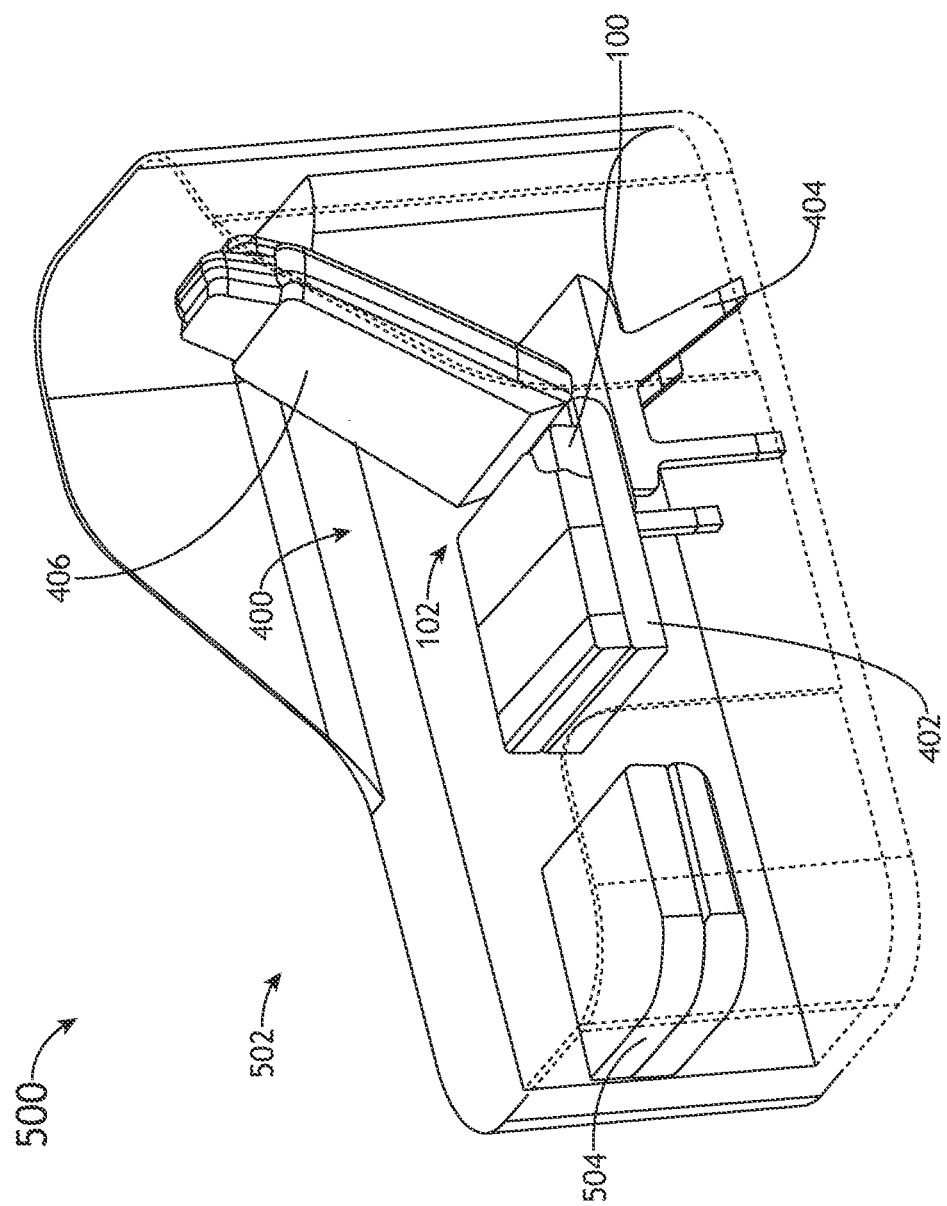
FIG. 5C illustrates a perspective view of a passenger compartment including an aircraft seat with a compressible cushion, in accordance with one or more embodiments of the present disclosure.
Figure 5D:
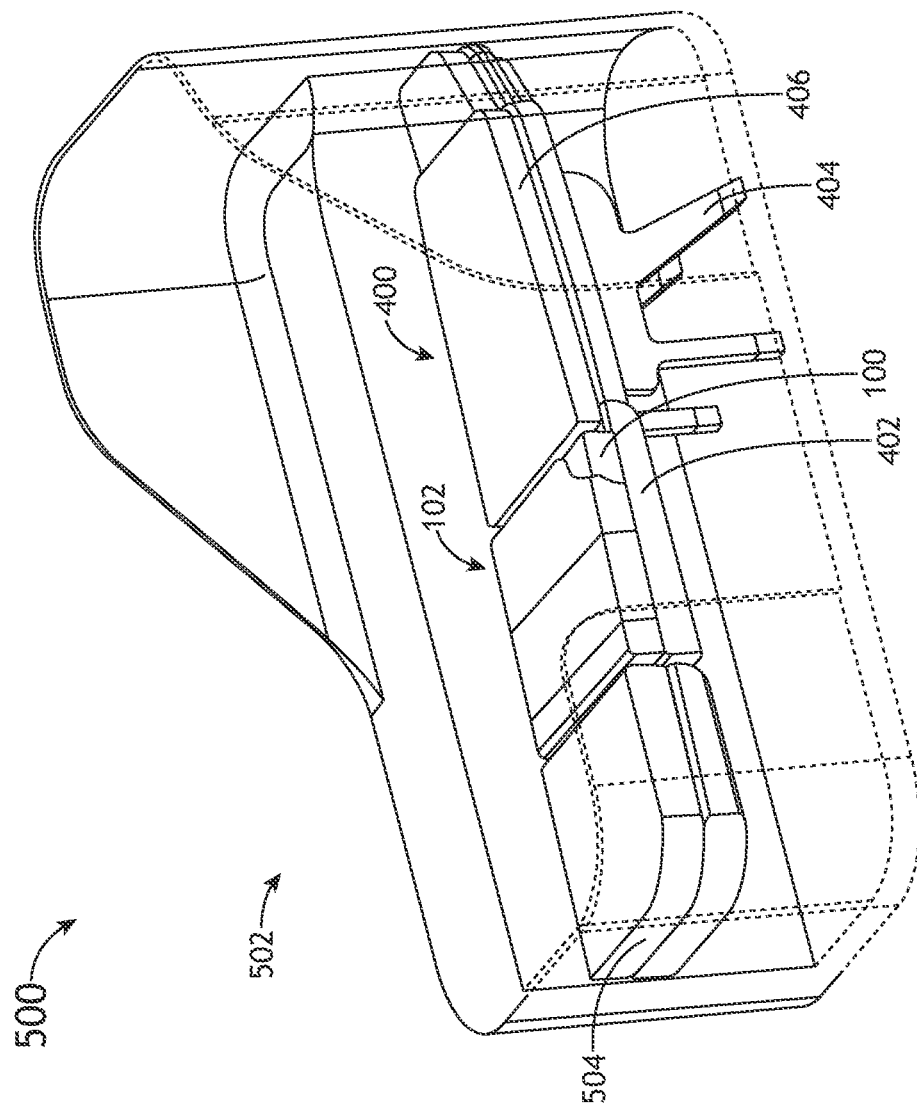
FIG. 5D illustrates a perspective view of a passenger compartment including an aircraft seat with a compressible cushion, in accordance with one or more embodiments of the present disclosure.

FIGS. 3A-3C illustrates a dress cover system 300, in accordance with one or more embodiments of the present disclosure.

In one embodiment, the dress cover system 300 includes a removable cover 302 and the dress cover 102 over the cushion 100. It is noted herein the removable cover 302 may protect the dress cover 102, providing a more easily-swappable component to the aircraft seat if the removable cover 302 gets damaged, as opposed to changing the dress cover 102 (e.g., with or without needing to change the cushion 100) if the dress cover 102 gets damaged. It is noted herein example embodiments of the dress cover 102 may be found in U.S. application Ser. No. 17/198,018, filed on Mar. 10, 2021, which is previously incorporated herein in the entirety.

In another embodiment, the removable cover 302 is manufactured from one or more sections. In general, the removable cover 302 may be fabricated from 1, 2 . . . up to an N number of sections. Where there are multiple sections, each section has a section top surface length that forms a percentage of a cover top surface length of the removable cover 302. Where there are multiple sections, adjacent sections may be joined together. For example, the adjacent sections may be joined together via sewing, a fabric adhesive, or the like. For instance, adjacent sections may be joined together at one or more seams 304.

Although a joining location is illustrated in FIGS. 3A-3C, it is noted herein the joining location is shown only for purposes of clarity and that the joining location may be hidden on the dress cover 102 and/or the removable cover 302 (e.g., non-accessible when the dress cover 102 is installed on the cushion 100) for purposes of preventing access to the joining location, cleanliness of design, meeting aviation guidelines and/or standards, or the like.

In another embodiment, the one or more sections of the removable cover 302 may be fabricated from a same type and/or pattern of material or a different type and/or pattern of material. For example, at least some of the sections of the removable cover 302 may be fabricated from different types of material. By way of another example, all sections of the removable cover 302 may be fabricated from a different type and/or pattern of material. By way of another example, all sections of the removable cover 302 may be fabricated from a same type and/or pattern of material. The one or more sections of the removable cover 302 may be fabricated from a material that is non-expandable and/or non-compressible (e.g., beyond the natural movement of the material structure or fabric weave). The one or more sections of the removable cover 302 may be fabricated from a material that is capable of expansion (e.g., via stretching) and/or compression.

Where the removable cover 302 is installed on an aircraft seat (e.g., aircraft seat 400, as described throughout the present disclosure), the type (or types) of material from which the one or more sections of the removable cover 302 may be fabricated are configured to meet aviation guidelines and/or standards. For example, the removable cover 302 may be rated to pass flame requirement tests for aircraft cabin interior installations (e.g., structures or components) such as seat cushions as set forth by the aviation guidelines and/or standards under 14 C.F.R. Part 25 and its Appendixes (e.g., 14 C.F.R. § 25.853, also found in FAA Advisory Circular (AC) 25.853-1), or the like. For instance, where the removable cover 302 includes multiple sections, the multiple sections may be joined together via attachment procedures configured to operate as a fire-resister or fire-blocker, to be rated to pass flame requirement tests for aircraft cabin interior installations (e.g., structures or components) such as seat cushions as set forth by the aviation guidelines and/or standards under 14 C.F.R. Part 25 and its Appendixes (e.g., 14 C.F.R. § 25.853, also found in FAA Advisory Circular (AC) 25.853-1), or the like.

In another embodiment, at least some of the one or more sections of the dress cover 102 and at least some of the one or more sections of the removable cover 302 may be fabricated from a same type and/or pattern of material or a different type and/or pattern of material.

It is noted herein fabricating at least some of the one or more sections of the dress cover 102 and the one or more sections of the removable cover 302 from a same type and/or pattern of material may allow for a matching, overlapping, or shared design on the dress cover 102 and the removable cover 302. For example, the design may be related to a vehicle brand or trim package (e.g., an airplane, an automobile, a boat, or the like), a vehicle manufacturer, a vehicle service provider (e.g., an airline, or the like), or be related to another type of marking with which a fabric may be printed or arranged in a pattern with other pieces of fabric.

In another embodiment, the removable cover 302 is coupled to one or more ends or surfaces to the dress cover 102. For example, the removable cover 302 may be fixed via fasteners, an interlocking assembly (e.g., a hook-and-loop assembly, a tab-and-groove assembly, or the like).

In another embodiment, the removable cover 302 is coupled to a component of a seat (e.g., aircraft seat 400, as described throughout the present disclosure) proximate to the dress cover 102 (e.g., a single or dual roll-blind system, or the like). For example, the removable cover 302 may be longer than the cover top surface length of the dress cover 102. For example, the removable cover 302 may hang over one or multiple ends of the dress cover 102. For instance, the removable cover 302 may hang over one or multiple ends of the dress cover 102 and may be fixed to components of the aircraft seat proximate to the cushion 100 (e.g., to prevent the removable cover 302 from sliding when the aircraft seat is occupied, being occupied, or being unoccupied).

In another embodiment, the dress cover 102 and the cushion 100 may slide under the removable cover 302 when the cushion 100 actuates (e.g., extends or retracts) between a retracted position or state and one or more extended positions or states. For example, as illustrated in FIG. 3B, the dress cover 102 may have an expanded top surface length when the cushion 100 is in position or state corresponding to the expansion length 212a (e.g., the length at which the cushion 100 is cut with the plurality of holes 202). By way of another example, as illustrated in FIG. 3C, the dress cover 102 may have a compressed top surface length when the cushion 100 is in a position or state corresponding to the compression length 212b (e.g., of one or more compressed positions or states). For instance, the expanded top surface length is longer than the compressed top surface length.

In both FIGS. 3B and 3C, the removable cover 302 remains atop the dress cover 102 and the cushion 100. As seen from the side profile views in FIGS. 3B and 3C, the dress cover 102 retains its shape despite the change in length of the top surface length, preventing an improper fit or interface that would otherwise be messier, have more lines, and include more gaps between sections of the cushion 100.

It is noted herein additional information about the removable cover 302 may be found in U.S. application Ser. No. 17/198,018, filed on Mar. 10, 2021, which is previously incorporated herein in the entirety.

FIGS. 4A and 4B illustrate portions of the aircraft seat 400, in accordance with one or more embodiments of the present disclosure. It is noted herein the dress cover 102 and the cushion 100 should be configured in accordance with aviation guidelines and/or standards when installed on the aircraft seat 400.

In another embodiment, the aircraft seat 400 includes a seat pan 402, a seat base 404, and a seat back 406. For example, the seat back 406 may include an integrated headrest or a coupling point for a separate installable headrest. It is noted herein the removable cover 302 may couple to the seat base 404 and/or the seat back 406, or to components coupled to the seat base 404 and/or the seat back 406.

In another embodiment, additional components may couple to and/or be integrated into the one or more aircraft seats 400 including, but not limited to, pivoting armrests, aircraft seatbelts, tray table support arms, or the like. It is noted herein the seat base 404 may attach to the one or more structural beams and secure to embedded aircraft seat tracks located in a floor of the aircraft cabin 500 via conventional track fasteners.

In another embodiment, the seat pan 402 includes a seat pan primary section 408 and the seat base 404 includes a seat base primary section 410. For example, the seat pan primary section 408 and the seat base primary section 410 may be separate or may be coupled together. For instance, the seat pan primary section 408 and the seat base primary section 410 may be configured to actuate together if coupled together.

In another embodiment, the seat pan 402 includes a seat pan extender 412 and the seat base 404 includes a seat base extender 414. For example, the seat pan extender 412 and the seat base extender 414 may be separate or may be coupled together. For instance, the seat pan extender 412 and the seat base extender 414 may be configured to actuate together if coupled together. By way of another example, the seat pan extender 412 may actuate relative to the seat pan primary section 408, and the seat base extender 414 may actuate relative to the seat base primary section 410.

It is noted herein the seat pan extender 412 being in an extended position or state may cause a void or cavity to form between the seat pan primary section 408 and the seat pan extender 412. In addition, it is noted herein the seat pan 402 may include an actuatable cover or plate (e.g., fabricated a rigid or flexible material) configured to prevent access to the formed void or cavity (e.g., coupled to the seat pan extender 412 and actuatable with the seat pan extender 412, or the like).

In another embodiment, the seat pan 402 supports the cushion 100 and the dress cover 102 (or the dress cover system 300, where the removable cover 302 is installed on the dress cover 102 and the cushion 100). In another embodiment, the dress cover 102 may be the compressed top length when the seat pan 402 is in a retracted position or state. In another embodiment, the dress cover 102 may be the expanded top length when the seat pan 402 is in an extended position or state.

In another embodiment, the cushion 100 may be dimensioned to conform or substantially conform to the aircraft seat 400. For example, at least one surface of the cushion 100 may be dimensioned to conform to a corresponding surface of the aircraft seat 400. By way of another example, components of the aircraft seat 400 may extend beyond the boundaries of the cushion 100, such that the at least one surface of the cushion 100 does not fully conform to the corresponding surface of the aircraft seat 400. By way of another example, a portion of the cushion 100 may wrap around or otherwise enclose a portion of the aircraft seat 400 (e.g., including, but not limited to, a front edge or leading portion of the cushion 100). In another embodiment, the cushion 100 may be dimensioned to conform to a portion of a user (e.g., a passenger, a crew member, or the like).

In another embodiment, the cushion 100, the dress cover 102, and/or the removable cover 302 may be attached to one or more components of the aircraft seat 400. For example, the one or more components may include, but not limited to, a diaphragm. By way of another example, the cushion 100, the dress cover 102, and/or the removable cover 302 and the one or more components of the aircraft seat 400 may be coupled with hook and loop fastener assemblies (e.g., Velcro®) or other fastener assemblies (e.g., attachment clips, or the like).

FIGS. 5A-5D illustrate an aircraft cabin 500, in accordance with one or more embodiments of the present disclosure.

In one embodiment, the one or more aircraft seats 400 may be independently-positioned within the aircraft cabin 500. For example, the aircraft seat 400 may include, but is not limited to, a business class or first-class passenger aircraft seat, an economy-class passenger aircraft seat, or the like. It is noted herein the terms "aircraft seats" and "passenger aircraft seats" may be considered equivalent, for purposes of the disclosure.

In another embodiment, the one or more aircraft seats 400 may be coupled together via one or more frames or frame elements such as structural beams. For example, the one or more aircraft seats 400 may be within a row of aircraft seats 400 coupled to a set of structural beams, where select aircraft seat 400 components may be shared with other aircraft seats 400. For instance, some frame elements may be shared between adjacent aircraft seats 400 while other frame elements may be common across an entire row of aircraft seats 400. In addition, the one or more aircraft seats 400 may be part of a two-aircraft seat, three-aircraft seat, four-aircraft seat, or five or more-aircraft seat row.

In another embodiment, the cabin 500 may include a passenger compartment 502. The passenger compartment 502 may include a privacy shell with one or more privacy shell elements. The privacy shell may include an opening within the one or more privacy shell elements into the passenger compartment 502. The passenger compartment 502 may include a door for the opening. For example, the door may swing or slide into an open position against a privacy shell element. By way of another example, a privacy shell element may be at least partially hollow, and the door may be slid into a cavity defined in the one or more privacy shell elements.

The passenger compartment 502 may include one or more monuments. For example, the monument may include, but is not limited to, a side stand, a tray or table, or the like. Where the monument includes a tray or table, the tray or table may include a top surface, a bottom surface, and/or one or more side surfaces. For example, the tray may include a single continuous side surface where all corners are rounded. By way of another example, the tray may include up to an N number of side surfaces where the tray includes up to an N number of corners. The tray or table may be fixed in position. It is noted herein, however, that the tray or table may be actuatable (e.g., may extend a select distance from a stowed position to an extended position proximate to a passenger). The aircraft seat 400 may be configured to avoid contact with the one or more monuments when transitioning between positions (e.g., between the upright or raised position and the lie-flat or bed position).

At least a portion of the passenger compartment 502 (e.g., at least a portion of the privacy shell, a monument of the one or more monuments, or the like) may conform to a portion of the aircraft seat 400. In this regard, the amount of aircraft cabin floor space necessary for the passenger compartment 502 may be reduced.

In another embodiment, where the aircraft seat 400 is an actuatable aircraft seat, the aircraft seat 400 may be rotatable about an axis (e.g., swivelable). The aircraft seat 400 may be fully positionable between the outer limits of motion as defined by the moveable components of the aircraft seat 400. Where the aircraft seat 400 is installed within a passenger compartment 502, the aircraft seat 400 may be fully positionable between the outer limits of motion as defined by one or more monuments of the passenger compartment 502. It is noted herein an upright or raised position may be considered a taxi, takeoff, or landing (TTOL) position during select stages of flight (though the upright or raised position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the aircraft seat 400 may be actuatable (e.g., translatable and/or rotatable) from the TTOL position to a non-TTOL position, and/or vice versa. Further, it is noted herein the aircraft seat 400 may be capable of a fully upright or raised position, and that the TTOL position may have a more reclined aircraft seat back cushion and a more angled upward aircraft seat pan cushion as compared to the fully upright or raised position. Therefore, the above description should not be interpreted as a limitation on the present disclosure but merely an illustration.

In general, an aircraft seat 400 may be translatable (e.g., trackable or slidable). The aircraft seat 400 may be rotatable about an axis cross-wise through the aircraft seat 400 into a position including, but not limited to, the upright or raised position, one or more lounge or reclined positions, and a lie-flat or bed position. For example, the aircraft seat 400 may transition directly between the upright or raised position and the lie-flat or bed position. By way of another example, it is noted herein the aircraft seat 400 may transition through one or more lounge or reclined positions between the upright or raised position and the lie-flat or bed position. By way of another example, the aircraft seat 400 may transition into one or more lounge or reclined positions in a motion separate from the transition between the upright or raised position and the lie-flat or bed position. Therefore, the above description should not be interpreted as a limitation on the scope of the disclosure but merely an illustration.

In another embodiment, the cabin 500 includes an ottoman 504. The aircraft seat 400 may be proximate to an ottoman 504. For example, the aircraft seat 400 and the ottoman 504 may form the lie-flat surface when the aircraft seat 400 and the ottoman 504 are each in a lie-flat or bed position.

The ottoman 504 may be positioned underneath and/or proximate to at least some of the one or more monuments of the passenger compartment 502. The ottoman 504 may be positioned within a footwell of the passenger compartment 502. For instance, one or more dimensions of the footwell may be changed by transitioning the aircraft seat 400 between the upright or raised position, a lounge or reclined position, and/or the lie-flat or bed position. It is noted herein that a portion of the ottoman 504 may be actuatable (e.g., along a set of tracks or linear rails) to a position outside of the footwell.

The ottoman 504 may be configured to translate and/or rotate about an axis through a sidewall of the ottoman to cause a top surface to face a passenger occupying the aircraft seat 400. For example, where the ottoman 504 may be configured to both translate and rotate, the ottoman 504 may be configured to independently rotate and/or translate. By way of another example, where the ottoman 504 may be configured to both translate and rotate, a rotation may prevent further translation until the ottoman 504 is returned to a select position and/or a translation may prevent further rotation until the ottoman 504 is returned to a select position.

It is noted herein, however, the aircraft seat 400 and/or the ottoman 504 may be limited to an upright or raised position and/or one or more lounge or reclined positions. In addition, it is noted herein the aircraft seat 400 may be the sole component forming a bed when the aircraft seat 400 is in a lie-flat or bed position. Therefore, the above description should not be interpreted as a limitation on the present disclosure but merely an illustration.

In another embodiment, the cushion 100 may be in a retracted position or state or one or more extended positions or states when the aircraft seat 400 is in the upright or raised position, a lounge or reclined position, and/or the lie-flat or bed position. For example, the cushion 100 may be in an extended position or state when the aircraft seat 400 is in the lie-flat or bed position, such that the cushion 100 comes into contact and/or there is a narrow enough gap to prevent items from falling between the cushion 100 and the ottoman 504 when the aircraft seat 400 is in the lie-flat or bed position. For instance, the aircraft seat 400 may be configured to actuate with the cushion 100 in the extended position or state into or out of the lie-flat or bed position. In addition, the aircraft seat 400 may be configured to actuate with the cushion 100 in the retracted position or state into or out of the lie-flat or bed position, and the cushion 100 may be configured to actuate between the extended position or state and the retracted position or state when the aircraft seat 400 is in the lie-flat or bed position.

In another embodiment, the cushion 100 may be in a retracted position or state or one or more extended positions or state when the aircraft seat 400 is in the upright or raised position, but may be in a retracted position or state in a lounge or reclined position and/or the lie-flat or bed position. For example, the cushion 100 may in an extended position or state when the aircraft seat 400 is in the upright or raised position, but may be required to retract prior to the aircraft seat 400 actuating between the upright or raised position, a lounge or reclined position, and/or the lie-flat or bed position. For instance, the cushion 100 may be in a retracted position or state when the aircraft seat 400 is in the lie-flat or bed position, such that the cushion 100 comes into contact and/or there is a narrow enough gap to prevent items from falling between the cushion 100 and the ottoman 504 when the aircraft seat 400 is in the lie-flat or bed position.

Although embodiments of the disclosure illustrate the cushion 100 being usable with the aircraft seat 400, it is noted herein, however, that the cushion 100 is not limited to the aviation environment and/or the aircraft components within the aviation environment. For example, the cushion 100 may be configured for any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art. By way of another example, the cushion 100 may be configured for commercial or industrial use in either a home or a business. Therefore, the above description should not be interpreted as a limitation on the present disclosure but merely an illustration.

As such, advantages of the present disclosure are directed to a compressible cushion 100 for an aircraft seat 400. Advantages of the present disclosure are also directed to an even compression of the cushion 100. Advantages of the present disclosure are also directed to distributing occupant weight with the compressible cushion.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A compressible cushion for an aircraft seat, comprising:
  a base structure; and
  a plurality of foam layers positioned on a seat pan of the aircraft seat, the plurality of foam layers comprising:
    a first foam layer stacked on the base structure; and
    at least a second foam layer stacked on the first foam layer, a density of the at least a second foam layer being less than a density of the first foam layer, the first foam layer and the at least a second foam layer being cut at a length corresponding to a length of the seat pan when the seat pan is in an extended position, the first foam layer and the at least a second foam layer each including a plurality of cuts, the plurality of cuts of the first foam layer and the plurality of cuts of the at least a second foam layer each being configured to compress when the seat pan actuates between the extended position and a retracted position.

2. The cushion of claim 1, the plurality of cuts in the first foam layer and the plurality of cuts in the at least a second foam layer each having a width preventing the plurality of cuts in the first foam layer and the plurality of cuts in the at least a second foam layer from fully collapsing when the seat pan is in the retracted position.

3. The cushion of claim 1, the plurality of cuts in the first foam layer being aligned with the plurality of cuts in the at least a second foam layer.

4. The cushion of claim 1, the first foam layer and the at least a second foam layer being joined together with an adhesive.

5. The cushion of claim 4, the plurality of cuts being made in the first foam layer and the plurality of cuts being made in the at least a second foam layer after the first foam layer and the at least a second foam layer are joined together with the adhesive.

6. The cushion of claim 4, the plurality of cuts being made in the first foam layer and the plurality of cuts being made in the at least a second foam layer prior to the first foam layer and the at least a second foam layer being joined together with the adhesive.

7. The cushion of claim 1, the at least a second foam layer comprising:
a second foam layer stacked on the first foam layer; and
a third foam layer stacked on the second foam layer.

8. The cushion of claim 7, a density of the second foam layer being less than the density of the first foam layer, a density of the third foam layer being less than the density of the second foam layer.

9. The cushion of claim 1, at least one of the base structure or the plurality of foam layers being dimensioned to conform to the seat pan of the aircraft seat.

10. The cushion of claim 1, at least one of the base structure or the plurality of foam layers being dimensioned to conform to an occupant seated in the aircraft seat.

11. The cushion of claim 1, at least a portion of the plurality of foam layers and at least a portion of the base structure being covered by a dress cover.

12. The cushion of claim 11, the plurality of foam layers being enclosed within the dress cover, at least a portion of the base structure being covered by the dress cover.

13. The cushion of claim 11, the plurality of foam layers and the base structure being enclosed within the dress cover.

14. An aircraft seat, comprising:
a seat pan configured to actuate between an extended position and a retracted position; and
a compressible cushion positioned on the seat pan, the compressible cushion comprising:
a base structure; and
a plurality of foam layers positioned on a seat pan of the aircraft seat, the plurality of foam layers comprising:
a first foam layer stacked on the base structure; and
at least a second foam layer stacked on the first foam layer, a density of the at least a second foam layer being less than a density of the first foam layer,
the first foam layer and the at least a second foam layer being cut at a length corresponding to a length of the seat pan when the seat pan is in the extended position,
the first foam layer and the at least a second foam layer each including a plurality of cuts, the plurality of cuts of the first foam layer and the plurality of cuts of the at least a second foam layer each being configured to compress when the seat pan actuates between the extended position and the retracted position.

* * * * *